Patented Aug. 8, 1939

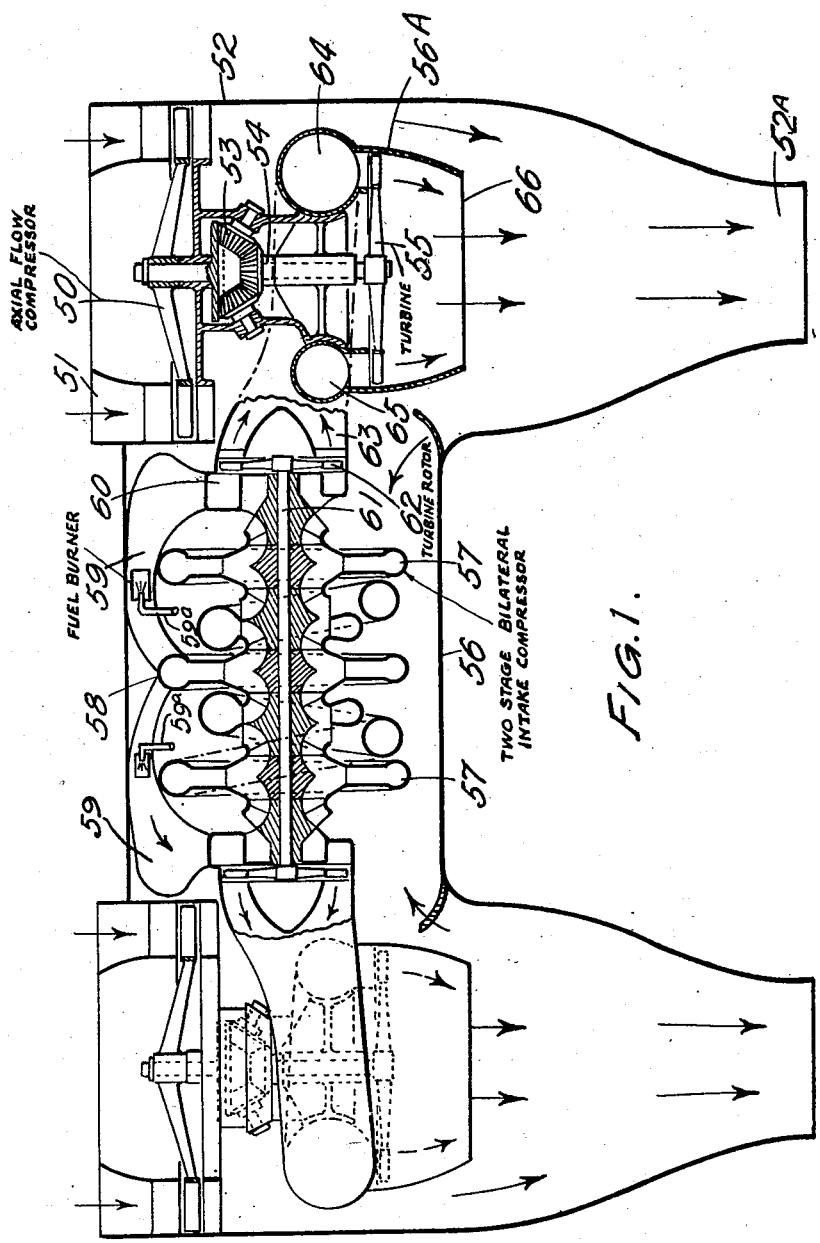

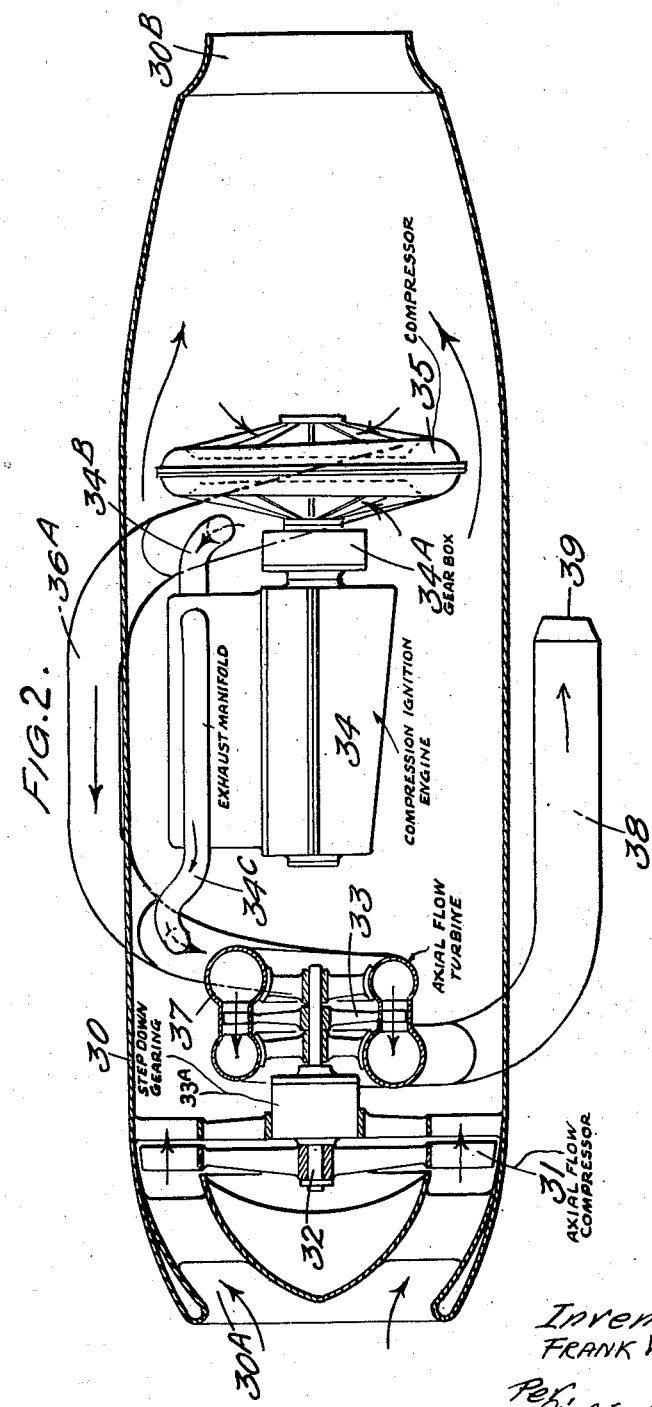

2,168,726

UNITED STATES PATENT OFFICE 2,168,726

PROPULSION OF AIRCRAFT AND GAS TURBINES

Frank Whittle, Trumpington, England

Application February 27, 1937, Serial No. 128,167
In Great Britain March 4, 1936

6 Claims. (Cl. 60—35.6)

This invention refers to apparatus, the function of which is to provide a supply of working fluid at a pressure above that of the atmosphere for the purpose of propelling an aircraft by fluid reaction, such propulsion being commonly known as "jet propulsion".

A known form of such an apparatus is one in which a centrifugal compressor compresses air into a combustion chamber wherein it is intended to be heated at constant pressure by the burning of a suitable fuel, the heated products of combustion then expanding through the nozzles of a turbine, the function of which is to drive the compressor and any desired auxiliaries. The fluid leaving the turbine, being capable of further expansion, forms a supply of working fluid for the production of power in various ways, such as that cited above.

In a reaction propulsion system for boats or air-craft, a prior proposal is the provision of a compressor followed by a burner and delivering through propulsion nozzle means, the compressor being fed by fluid taken in at a pressure created by movement of the whole vehicle in the fluid medium, and it is mentioned that the internal combustion engine which drives the compressor may be fed by part of its output.

The term "combustion engine" as herein used includes any engine which compresses air, effects combustion in it, and is operated by the expansion of the combustion products, and thus includes a reciprocating internal combustion engine or a compressor-burner-turbine combination in which the turbine drives the compressor.

The purpose of this invention is to provide an improved system, apparatus, or power unit, for the same purpose. The primary object is to provide as great a mass flow of the working fluid as possible in proportion to the size of the mechanism employed, in order that certain losses, such as fluid friction loss, shall be kept as low as possible in all components.

High mass flow is particularly desirable in the case of propulsion of aircraft by fluid reaction, in order that the jet velocity shall be as low as possible for a given thrust, and it is to this purpose that the invention is primarily applicable.

According to the invention, there is combined in a fluid-reaction propulsion system for aircraft an air compressor which in effect divides the output from the compressor into a first stream which is passed out through a propulsion nozzle and a second stream, a combustion engine supplied by the second stream, and a gas turbine supplied wholly or partly by the effluent gas from said engine and driving the said air compressor. In this system the combustion products of the engine preferably contribute to the thrust by fluid reaction, for example joining the main flow from which they were originally diverted before combustion. The engine referred to may be a compressor-burner-gas turbine combination. The system is embodied, in accordance with the invention, in a unit for aircraft propulsion, and this in two examples takes the form diagrammatically illustrated in the drawings. Where a gas turbine is employed it may be adapted to operate with a plurality of stages of compression of the kind in which the compressor means is in the form of a bilateral intake centrifugal compressor and may generally follow the form described in relation to my British patent specification No. 456,980 and to my United States application Serial No. 78,282, filed May 6, 1936, now abandoned. It may be convenient to provide the whole device in the form of a hollow nacelle with an entry opening to face the direction of travel (whereby incidentally a certain head of pressure termed "Pitot pressure" may be derived) and in such nacelle all those components apt to lose heat may be completely housed to conserve energy. The invention is further to be understood by reference to the following description. Where the description or claims seem to refer to the whole or a determined part, of a flow, it is to be understood that a portion thereof may be separated and utilized for such purposes as driving auxiliaries, heating, etc.

The accompanying drawings diagrammatically illustrate applications of the invention:

Figure 1 is a partial section in plan of a twin aircraft propulsion system, employing a type of combustion unit more fully explained in the specification of my application Serial No. 78,282 and my British patent specification No. 456,980; and Figure 2 is a partial elevation section of a further alternative example.

Referring to Figure 1, there is illustrated what may be termed a twin apparatus, that is, it is symmetrical about a central line. For aircraft use it may be important to select the directions of rotation of rotatable parts, having regard to their gyrostatic reactions. Considering this apparatus as comprising virtually a port and a starboard intake and accompanying reaction jets, only one side will be described, the other, apart from any question of rotational direction, being substantially identical. The initial compressors are of the axial flow single-stage type, whilst the internal combustion engine includes a constant pressure gas turbine of the type described below. The arrangement involves a first stage axial flow compressor 50 supplied by an annular intake orifice 51, and discharging into a nacelle 52 within which, behind the compressor 50 is driving gear 53 powered by a shaft 54 connected to a driving turbine 55 within a casing 56A. The main flow created in the first place by the compressor 50 and subject to any Pitot pressure at 51 of which advantage can be taken, passes rearwardly through the nacelle 52 to emerge from the nozzle 52A. The flow from the compressor 50 is divided, part of it is diverted (and any suitable guiding means such as baffles 56A may help to divert it) into a lateral trunk 56 which is common to both starboard and port nacelles. Within the trunk 56 is housed a two-stage bilateral intake compressor, a fuller description of which can be found in the specification of my application Serial No. 78,282 and my British patent specification No. 456,976. In short, this comprises twin first stage compressors 57 outputting to the second stage compressor 58. From the secondary diffuser of the compressor 58 the second stage output is led to a combustion chamber 59 which is connected to and discharges into the delivery chamber 60 of a turbine, the mechanical output of which drives the compressor shaft 61 common to both 57 and 58. In the combustion chamber 59, a suitable fuel-burning means 59a, arranged for example somewhat in the manner of that described in relation to the above numbered specifications. This unit comprising compressor means, combustion means, and turbines, is a combustion engine. It is here noted that as between port and starboard sides of the whole apparatus the working directions must of course be appropriate for both port and starboard turbines to drive the shaft 61 mutually. The combustion effluent expands through the vanes of the gas turbine rotor 62 and by a passage 63, 64, 65 is delivered to the nozzle scroll of the turbine 55 through which these gases expand further rejoining the main flow in the nacelle 52 through the exhaust 66.

In the alternative illustrated diagrammatically in Figure 2, the propelling unit comprises a nacelle or duct 30 with a forwardly facing entry 30A and a rearwardly facing exit or propulsion nozzle 30B. This nacelle encloses within its entry 30A an axial flow compressor with rotor 31 driven by a shaft 32 from an axial flow turbine rotor 33. In practice there will be step-down gearing 33A between the turbine 33 and rotor 31. Also within the nacelle 30 is a compression ignition engine represented at 34; this engine drives through its gear box 34A a centrifugal bilateral intake compressor 35 with its intakes (indicated by arrows) collecting from the interior of the nacelle 30. The output of the compressor 35 is led by a duct indicated at 36A which leads such output in the direction of the arrow to the nozzle scroll 37 of the turbine 33, the effluent therefrom escaping through the duct 38 and a rearwardly facing propulsion nozzle 39 with such energy as remains after passage through the turbine 33. This unit therefore consists in a first compressor with divided output, a second and centrifugal compressor intaking the diverted flow of air driven by and supplying part of its air output to the compression ignition engine 34, the exhaust from which rejoins the rest of the air supply from the said second compressor to form the working fluid in the turbine 33. To this end the engine 34 has its air intake 34B in the duct 36A and its exhaust 34C returning to that duct. If desired, the engine 34 may also have its own supercharger, and of course its own auxiliary apparatus. The whole output of the first compressor is finally employed for reaction propulsion.

What I claim is:

1. A gaseous jet reaction propelling unit for aircraft, comprising an air duct with an entry opening to face the direction of travel, an axial flow compressor therein, a centrifugal compressor supplied with part of the flow therefrom, a fuel burning device in the output of the centrifugal compressor, a turbine driving the centrifugal compressor and operated by the flow from said centrifugal compressor and burning device, a second turbine driving the axial flow compressor and operated by the exhaust gases from the first turbine, an exhaust passage from the second turbine into the duct behind the axial flow compressor, and an outlet orifice for the duct facing oppositely to the entry.

2. A unit according to claim 1, in which there are two ducts and associated axial flow compressors and second turbines, and a single centrifugal compressor unit connected and cooperating with both ducts.

3. In a fluid reaction propulsion system for aircraft, a combination of an air compressor, a propulsion nozzle, means for dividing the output from the compressor into a first stream which is passed out through the propulsion nozzle and a second stream, a combustion engine supplied by the second stream, and a gas turbine supplied at least partly by the effluent gas from said engine and driving said air compressor.

4. A system as set forth in claim 3 in which means are provided whereby the exhaust gases from the turbine also contribute to the thrust by fluid reaction.

5. A system as set forth in claim 3, in which means are provided whereby the exhaust gases from the turbine rejoin the remainder of the compressor output before final expansion.

6. A system as claimed in claim 3 in which said engine includes a gas turbine other than that which drives said compressor, said gas turbine being a constant pressure gas turbine, and a centrifugal compressor for supplying gas under pressure for said gas turbine and connected thereto and driven thereby.

FRANK WHITTLE.